(12) United States Patent
Mizuta

(10) Patent No.: US 9,404,934 B2
(45) Date of Patent: Aug. 2, 2016

(54) SENSOR UNIT AND MOTION MEASUREMENT SYSTEM USING THE SAME

(71) Applicant: Seiko Epson Corporation, Tokyo (JP)

(72) Inventor: Kazumasa Mizuta, Fujisawa (JP)

(73) Assignee: Seiko Epson Corporation (JP)

( * ) Notice: Subject to any disclaimer, the term of this patent is extended or adjusted under 35 U.S.C. 154(b) by 191 days.

(21) Appl. No.: 13/908,377

(22) Filed: Jun. 3, 2013

(65) Prior Publication Data

US 2013/0319113 A1    Dec. 5, 2013

(30) Foreign Application Priority Data

Jun. 5, 2012  (JP) ................................. 2012-127814

(51) Int. Cl.
*G01P 1/02*    (2006.01)
*G01P 1/00*    (2006.01)

(52) U.S. Cl.
CPC ................. *G01P 1/023* (2013.01); *G01P 1/003* (2013.01)

(58) Field of Classification Search
CPC ............ G01P 1/003; G01P 1/023; G01P 1/02
USPC ............ 73/493, 504, 514, 526, 273, 532, 654
See application file for complete search history.

(56) References Cited

U.S. PATENT DOCUMENTS

| | | | |
|---|---|---|---|
| 5,048,952 A | 9/1991 | Miyata et al. | |
| 6,323,529 B1 * | 11/2001 | Nagahara | G01P 1/023 257/254 |
| 6,474,133 B1 * | 11/2002 | Okada | G01L 1/148 73/1.38 |
| 7,562,575 B2 * | 7/2009 | Hatano | G01P 1/023 73/514.01 |
| 7,572,659 B2 * | 8/2009 | Tsubaki et al. | 438/48 |
| 7,656,746 B2 * | 2/2010 | De Kok | G01V 1/16 367/178 |
| 9,038,463 B2 * | 5/2015 | Takizawa | B81B 7/0041 73/430 |
| 2006/0150739 A1 * | 7/2006 | Yasuda | G01H 11/06 73/654 |
| 2006/0227984 A1 * | 10/2006 | Sinclair | G01P 15/125 381/174 |
| 2011/0041608 A1 * | 2/2011 | Wilner | B81B 3/0078 73/504.15 |
| 2012/0312094 A1 * | 12/2012 | Uchida | G01C 19/5628 73/504.04 |

FOREIGN PATENT DOCUMENTS

| | | |
|---|---|---|
| JP | 01-302169 | 12/1989 |
| JP | 3-170065 | 7/1991 |
| JP | 07-8775 | 2/1995 |
| JP | 09-145738 | 6/1997 |

* cited by examiner

*Primary Examiner* — John Fitzgerald
*Assistant Examiner* — Suman K Nath
(74) *Attorney, Agent, or Firm* — Harness, Dickey & Pierce, P.L.C.

(57) ABSTRACT

The first buffer portion provides a first base portion and a first outer wall provided on a peripheral edge of the first base portion. The second buffer portion provides a second base portion which provides a mounting surface outside to a measurement target, and a second outer wall provided on a peripheral edge of the second base portion. The buffer body provides the first base portion and a top surface of the second outer wall abutting against each other. A housing portion for the sensor portion is provided inside. A holding portion which holds the sensor portion is provided at least at a part of the top surface of at least one of the first buffer portion and the second buffer portion. The sensor portion is held by the holding portion.

7 Claims, 12 Drawing Sheets

SENSOR UNIT AND MOTION MEASUREMENT SYSTEM USING THE SAME

BACKGROUND

1. Technical Field

The present invention relates to a sensor unit and a motion measurement system or the like using the sensor unit.

2. Related Art

According to the related art, when a measurement device such as a motion sensor which detects acceleration, angular velocity and the like is mounted on a measurement target such as sporting equipment, a shock and vibration absorber is arranged between the measurement device and the measurement target. As the shock and vibration absorber damps a shock and vibration from the measurement target, the measurement device carries out accurate measurement without being affected by the shock and vibration.

According to JP-A-1-302169, a buffer is mounted on an outer surface of an exterior package of an acceleration sensor, thus preventing the sensor from being damaged by a fall when the sensor is carried around. The literature discloses the acceleration sensor can be mounted on a vehicle via the buffer.

According to JP-A-3-170065, on a first member with high mechanical strength which supports a substrate of an acceleration sensor, a buffer is provided parallel to a connector unit. As the connector is connected to a main body unit, the buffer is laid between the acceleration sensor and the main body unit.

According to JP-UM-A-7-008775, an elastic cover body with high shock absorptivity covers a housing of an acceleration sensor. According to JP-A-9-145738, a buffer is provided between an acceleration sensor and a substrate.

However, JP-A-1-302169 to JP-A-9-145738 do not disclose a structure to install a sensor portion such as an acceleration sensor onto sporting equipment.

FIG. 1 shows a comparative example in which when a sensor portion 2 is mounted on sporting equipment, for example, on a mounting surface 1b provided at a grip end 1a of a tennis racket 1, a shock and vibration absorber 3 is provided as in-between, as in JP-A-1-302169 to JP-A-9-145738. In the case where a motion of the tennis racket 1 is measured by the sensor portion 2, the shock and vibration absorber 3 can be provided as in-between as in the comparative example of FIG. 1 in order to prevent direct transmission of a shock and vibration generated when the tennis racket 1 strikes a ball to the sensor portion 2.

Here, in order for the shock and vibration absorber 3 to absorb a strong shock and vibration at the time of striking, it is necessary to increase the volume of the shock and vibration absorber 3 or switch to a material that can easily absorb a shock and vibration.

However, if the volume of the shock and vibration absorber 3 is increased, for example, as shown in FIG. 2, the shock and vibration absorber 3 becomes heavier, making the whole racket 1 heavier and also changing weight balance of the tennis racket 1. The shock and vibration absorber 3 protruding as shown in FIG. 2 becomes an obstruction when a user holds the grip of the tennis racket 1.

Meanwhile, if the material of the shock and vibration absorber 3 is softened so that the material can easily absorb a shock and vibration, as shown in FIG. 3, the sensor portion 2 itself swings, for example, in the direction of arrows shown in FIG. 3 and cannot measure the motion of the tennis racket 1 accurately.

SUMMARY

An advantage of some aspects of the invention is to solve at least apart of the problems described above, and some aspects of the invention can be implemented as the following forms or application examples.

Application Example 1

This application example of the invention is directed to a sensor unit including: a buffer body having a first buffer portion and a second buffer portion that abuts against the first buffer portion and is softer than the first buffer portion; and a sensor portion arranged inside the buffer body. The first buffer portion provides a first base portion and a first outer wall provided on a peripheral edge of the first base portion. The second buffer portion provides a second base portion which provides a mounting surface outside to a measurement target, and a second outer wall provided on a peripheral edge of the second base portion. The buffer body provides the first base portion and the second base portion facing each other and also provides a top surface of the first outer wall and a top surface of the second outer wall abutting against each other. A housing portion for the sensor portion is provided inside. A holding portion which holds the sensor portion is provided at least at a part of the top surface of at least one of the first buffer portion and the second buffer portion. The sensor portion is held by the holding portion.

According to such a sensor unit, the first buffer portion and the second buffer portion that is softer than the first buffer portion are provided in the buffer body. The sensor portion is held by the holding portion provided at least a part of the top surface of at least one of the first buffer portion and the second buffer portion. In the sensor unit, since the first buffer portion is provided in such a way as to hold the second buffer portion down, the second buffer portion can be deformed easily, thus restraining transmission of a shock and vibration to the sensor portion. The first buffer portion absorbs an excess shock and vibration that cannot be absorbed by the second buffer portion.

Application Example 2

In the sensor unit according to the above application example, it is preferable that the housing portion is filled with a filler.

According to such a sensor unit, since the void is filled with the filler, the filler can hold the sensor portion. The filler absorbs deformation of the second buffer portion and can reduce transmission of the deformation to the sensor portion. Moreover, the filler can hold the sensor portion in a hollow state without making the sensor portion directly contact the second buffer portion. Therefore, transmission of a shock and vibration can be minimized.

Application Example 3

In the sensor unit according to the above application example, it is preferable that the sensor portion provides a sensor mounted on a substrate and that a peripheral edge portion of the substrate is held by the holding portion.

According to such a sensor unit, the substrate provided in the sensor portion is held by the holding portion with a gap to avoid abutting against the first buffer portion. Thus, transmission of a shock and vibration from the first buffer portion to the sensor portion held by the holding portion of the second buffer portion can be restrained. Also, since a shock and vibration applied to the second buffer portion is transmitted to the first outer wall abutting against the second outer wall, by providing a gap between the first buffer portion and the substrate, transmission of a shock and vibration transmitted to the first buffer portion to the sensor portion via the substrate held by the holding portion can be restrained.

Application Example 4

In the sensor unit according to the above application example, it is preferable that there is a gap between the substrate and the top surface.

According to such a sensor unit, a gap is provided between the substrate and the top surface, and the sensor portion is provided in the housing portion. In the sensor unit, a shock and vibration is absorbed mainly by the deformation of the second buffer portion and transmission of the shock and vibration to the sensor portion provided in the housing portion can be restrained. Also, in the case where a gap is provided between the substrate and the top surface, and the housing portion is a void, the sensor portion cannot abut against the buffer body except on the holding portion. Therefore, direct transmission of the shock and vibration to the sensor portion can be restrained.

Application Example 5

In the sensor unit according to the above application example, it is preferable that the first buffer portion and the second buffer portion are fitted with each other.

According to such a sensor unit, the top surface of the first buffer portion and the second buffer portion are fitted with each other. Therefore, a shock and vibration from a measurement target is absorbed by the deformation of the second buffer portion. Moreover, when an excess shock and vibration that cannot be absorbed by the second buffer portion is transmitted to the first buffer portion, a shift of the first buffer portion and the second buffer portion from each other can be restrained.

Application Example 6

In the sensor unit according to the above application example, it is preferable that the second buffer portion provides a smaller specific gravity than the first buffer portion.

According to such a sensor unit, since the second buffer portion provides a smaller specific gravity than the first buffer portion, the first buffer portion can have a greater weight than the second buffer portion and deformation of the second buffer portion by the weight of the first buffer portion can be restrained.

Application Example 7

This application example of the invention is directed to a motion measurement system including the above sensor unit.

According to such a motion measurement system, since the system includes the above sensor unit, the buffer body can absorb an excessive shock and vibration that is generated, for example, by a strike with a measuring target. Thus, an unwanted shock and vibration for measurement of a motion of the measuring target can be damped.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
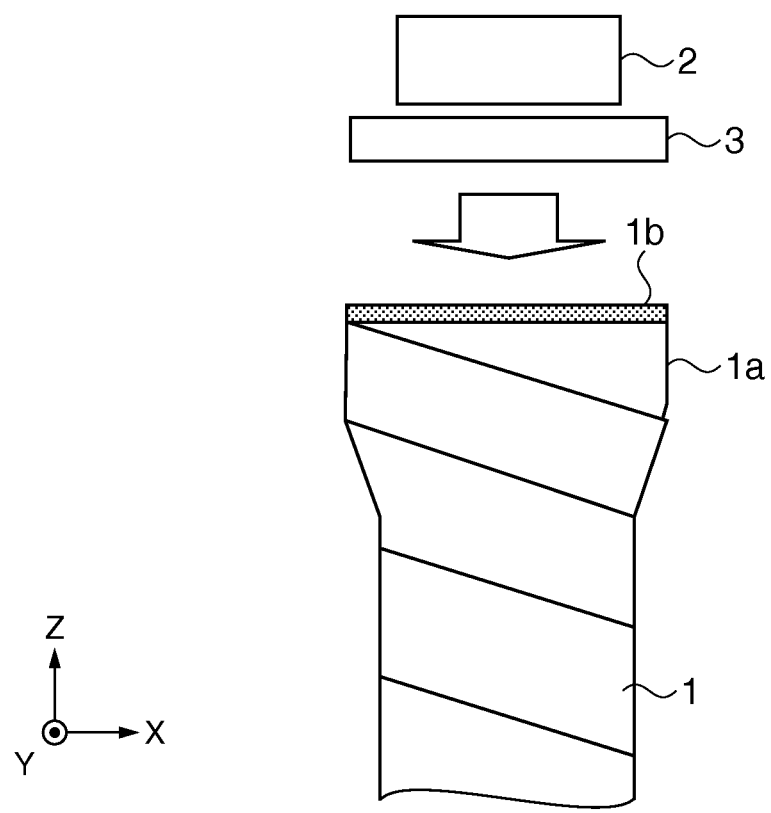
FIG. 1 shows a comparative example in which a sensor portion is fixed via a shock and vibration absorber to a grip end of a tennis racket.

Hereinafter, embodiments of the invention will be described with reference to the drawings. In the drawings described below, each component is shown in a large enough size to be recognized in the drawings and therefore the dimension and proportion of each component may be different from the actual component according to need. Also, an XYZ orthogonal coordinate system is set and the positional relation of each portion is described with reference to this XYZ orthogonal coordinate system. A predetermined direction within a vertical plane is defined as an X-axis direction. A direction orthogonal to the X-axis direction within the vertical plane is defined as a Y-axis direction. A direction orthogonal to each of the X-axis direction and the Y-axis direction is defined as a Z-axis direction. Referring to the gravitational direction, the gravitational direction is defined as a downward direction and the opposite direction is defined as an upward direction.

First Embodiment

Figure 4:
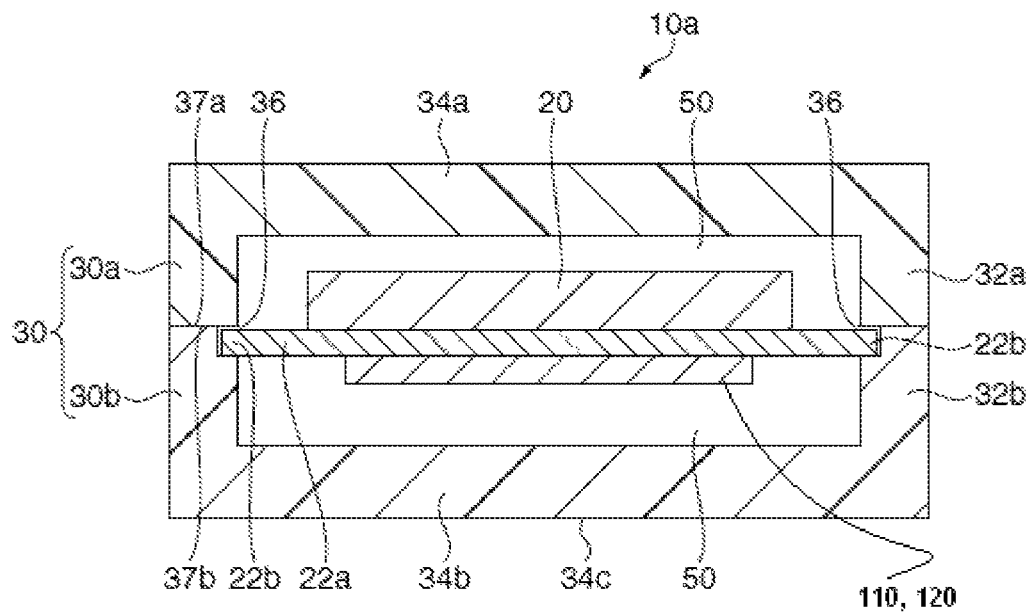
FIG. 4 schematically shows a cross section of a sensor unit according to a first embodiment.

FIG. 4 is a sectional view schematically showing a cross section of a sensor unit according to a first embodiment of the invention. A sensor unit 10a according to the first embodiment shown in FIG. 4 provides a sensor portion 20 and a buffer body 30.

The sensor portion 20 provides a three-axis acceleration sensor and a three-axis angular velocity sensor, and a drive circuit and a signal processing circuit for the sensors, for example, installed on face and back sides of a substrate 22a. The maximum acceleration that can be measured by the sensor portion 20 is, for example, 50 G.

The buffer body 30 provides a first buffer portion 30a and a second buffer portion 30b. The first buffer portion 30a provides a first base portion 34a and a first outer wall 32a extending from the first base portion 34a. The second buffer portion 30b provides a second base portion 34b, a second outer wall 32b extending from the second base portion 34b, and a holding portion 36 at one end opposite to the second base portion 34b, of the second outer wall 32b. In the sensor unit 10a of this embodiment, plural first outer walls 32a and second outer walls 32b are extending from the first base portion 34a and the second base portion 34b. However, the number of these walls is not limited to this example and a set of a first outer wall 32a and a second outer wall 32b may be provided. In this embodiment, a form in which two first outer walls 32a and two second outer walls 32b are extending is described.

In the buffer body 30, the first base portion 34a and the second base portion 34b fact each other and the first outer walls 32a and the second outer walls 32b abut against each other. The second base portion 34b is bonded and fixed to the mounting surface 1b of the tennis racket 1 (see FIG. 1), for example, with a double-side adhesive tape or the like, using a surface opposite to the first base portion 34a as a mounting surface 34c. Also, the buffer body 30 provides a housing portion 50 that is surrounded by the first base portion 34a, the second base portion 34b, the first outer walls 32a, and the second outer walls 32b.

In the buffer body 30, a shock and vibration transmitted from the mounting surface 34c is absorbed by the second buffer portion 30b. An excess shock and vibration that cannot be absorbed there is transmitted from the second outer walls 32b to the first outer walls 32a of the first buffer portion 30a and is absorbed by the first buffer portion 30a.

The sensor portion 20 is provided in the housing portion 50. A peripheral edge portion 22b that is an edge portion of the substrate 22a is held by the holding portions 36 provided on top surfaces 37b of the second outer walls 32b of the second buffer portion 30b. The substrate 22a is held by the holding portions 36 with a gap to avoid abutment against top surfaces 37a provided on the first outer walls 32a of the first buffer portion 30a. Therefore, when a shock and vibration is transmitted from the second outer walls 32b to the first outer walls 32a, transmission of the shock and vibration to the sensor portion 20 via the substrate 22a held there can be restrained.

While the holding portions 36 in this embodiment are provided on the top surfaces 37b, the holding portions 36 may also be provided on the top surfaces 37a. In such a case, the substrate 22a held by the holding portions 36 is provided in such a way as to avoid abutting against the top surfaces 37b.

As the member used for the second buffer portion 30b, a softer material than the member used for the first buffer portion 30a is used. In other words, as the member used for the first buffer portion 30a, a harder material than the member used for the second buffer portion 30b is used. Also, the second buffer portion 30b uses a member with smaller specific gravity than the first buffer portion 30a. In other words, the first buffer portion 30a uses a member with a greater specific gravity than the second buffer portion 30b. In the buffer body 30, for example, if rubber is used for the first buffer portion 30a, urethane foam can be used for the second buffer portion 30b. The member used for the first buffer portion 30a may be silicone resin and the like as well as rubber. The member used for the second buffer portion 30b may be polyurethane and the like as well as urethane foam.

The buffer body 30 in the first embodiment of the invention provides a shock and vibration absorbing structure that is formed as a two-stage structure. The first buffer portion 30a using the harder material is superimposed on the second buffer portion 30b using the softer material.

In the buffer body 30, since the first buffer portion 30a made of the harder material and with a greater specific gravity is superimposed on the second buffer portion 30b made of the softer material and with a smaller specific gravity, the second buffer portion 30b can be formed easily and can restrain a shock and vibration. The first buffer portion 30a can absorb an excess shock and vibration that cannot be absorbed by the second buffer portion 30b.

Figure 5:
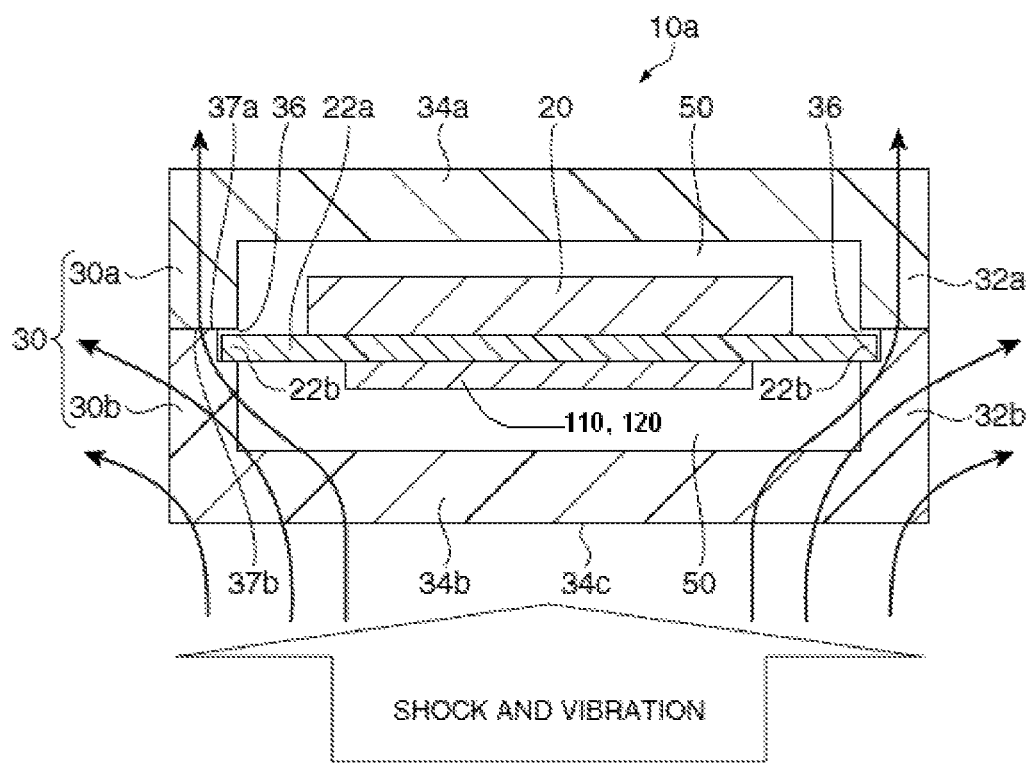
FIG. 5 schematically shows a transmission effect of a shock and vibration in the first embodiment.

Thus, a shock and vibration that is generated when the tennis racket 1 shown in FIG. 1 hits a ball or the like is absorbed by the first buffer portion 30a and the second buffer portion 30b of the sensor unit 10a and cannot be easily transmitted to the sensor portion 20, as shown in FIG. 5.

Figure 2:
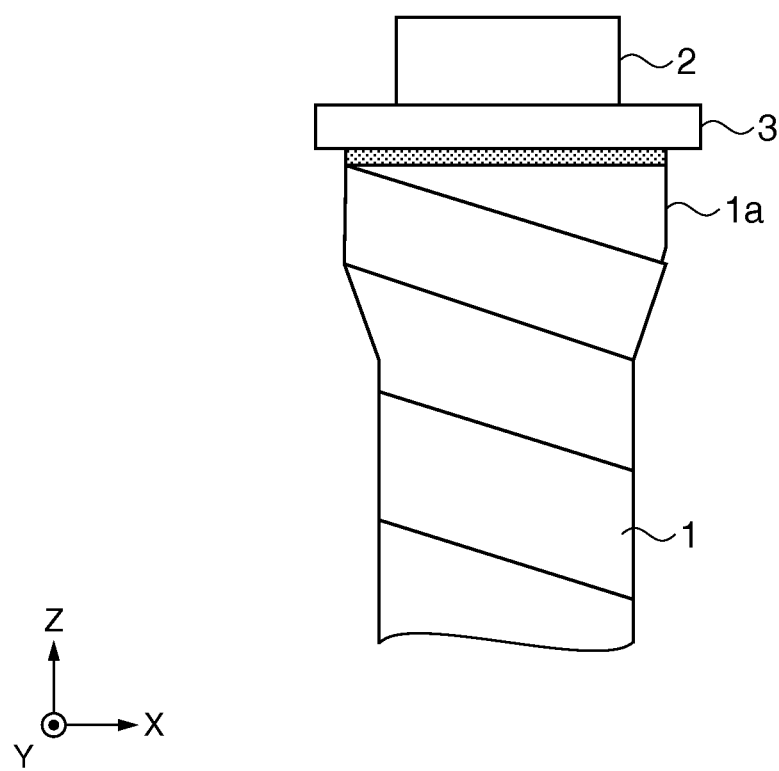
FIG. 2 shows a form in which the volume of the shock and vibration absorber is increased in the comparative example shown in FIG. 1.
Figure 3:
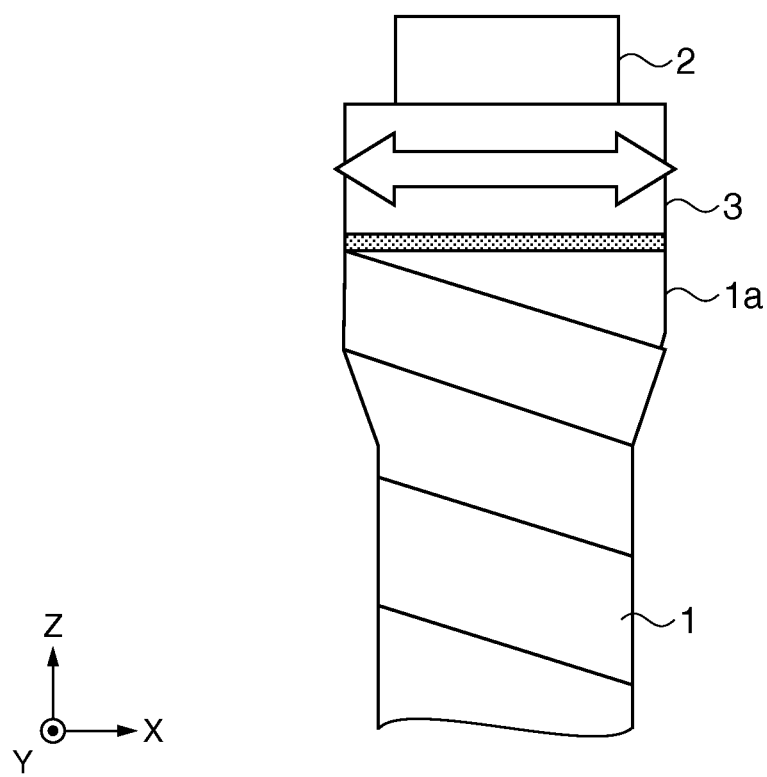
FIG. 3 shows a form in which the material of the shock and vibration absorber is softened in the comparative example shown in FIG. 1.
Figure 6:
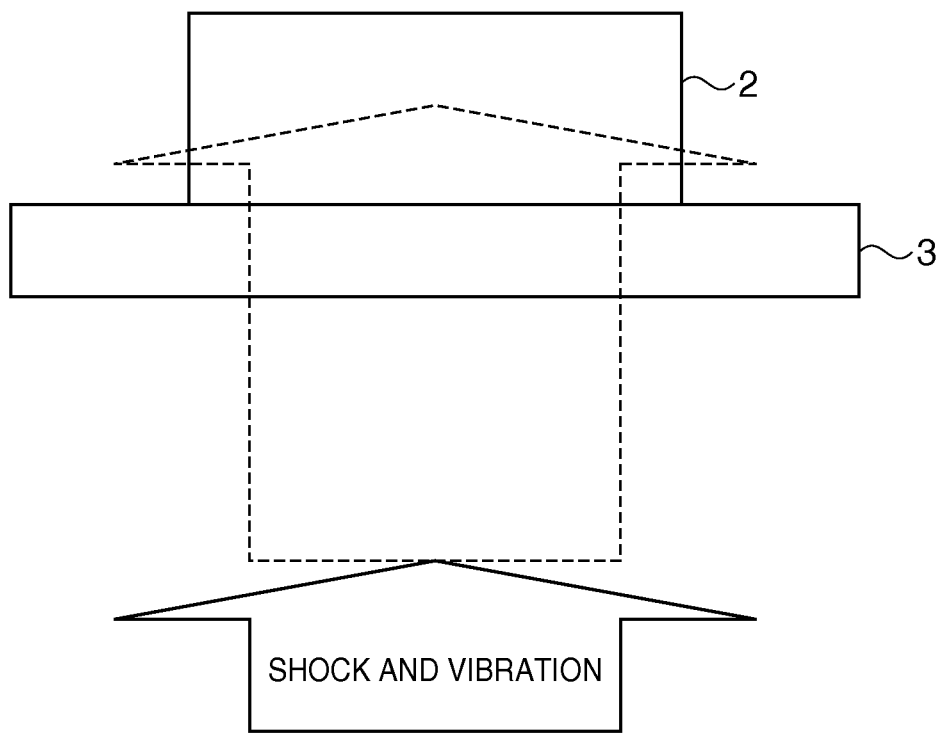
FIG. 6 shows a transmission effect of a shock and vibration in a rear-end collision state in the comparative example shown in FIG. 1.

On the other hand, in the comparative example shown in FIGS. 1 to 3, a shock and vibration that is generated when the tennis racket 1 strikes an object or the like is absorbed by the shock and vibration absorber 3 and thus damped, as shown in FIG. 6. However, since the sensor portion 2 exists in the escape path of the shock and vibration that cannot be absorbed by the shock and vibration absorber 3, an excessive shock and vibration is directly transmitted to the sensor portion 2 in a so-called rear-end collision state.

In FIG. 4, the housing portion 50 as an in-between can be further provided between the second buffer portion 30b and the sensor portion 20. Thus, deformation of the second buffer portion 30b can be absorbed by the housing portion 50 and therefore transmission of a shock and vibration to the sensor portion 20 can be reduced further.

In the buffer body 30, the housing portion 50 can allow (absorb) deformation generated in the second outer walls 32b and the second base portion 34b by a shock and vibration. This housing portion 50 can be a void (air gap). By forming the housing portion 50 as a void, deformation of the second buffer portion 30b is absorbed by the housing portion 50 and transmission of the deformation to the sensor portion 20 can be reduced.

FIGS. 7A to 9C show graphs illustrating the results of shock and vibration tests.

Figure 7A:
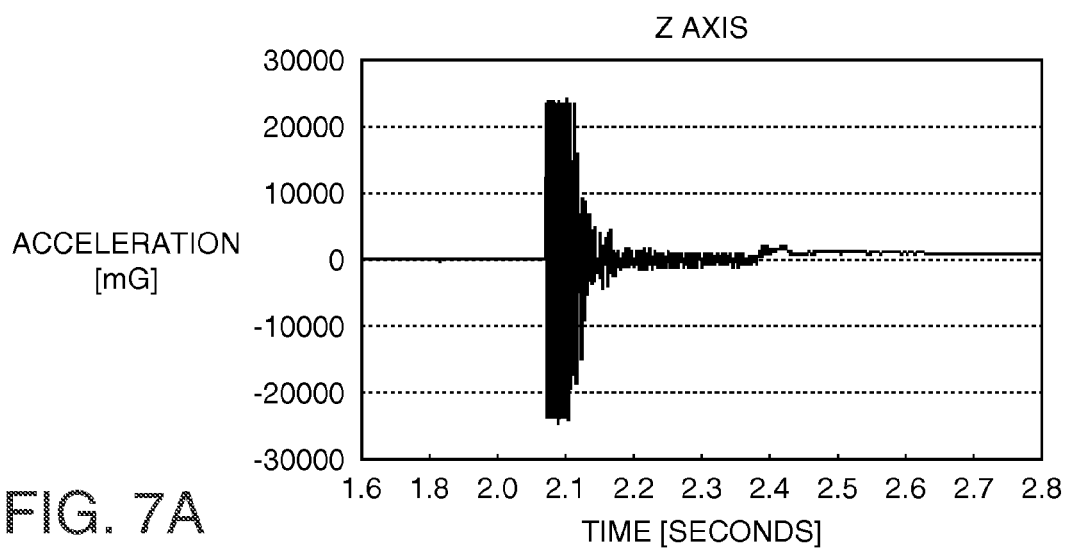
FIGS. 7A to 7C show measurement data of acceleration of a shock and vibration applied to a sensor unit according to a related-art example.
Figure 7B:
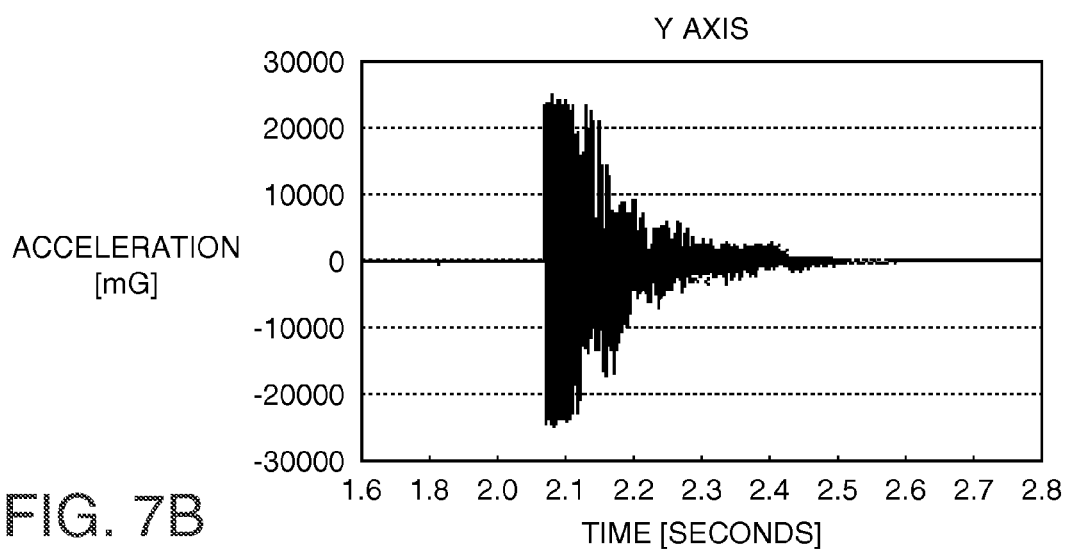
Figure 7C:
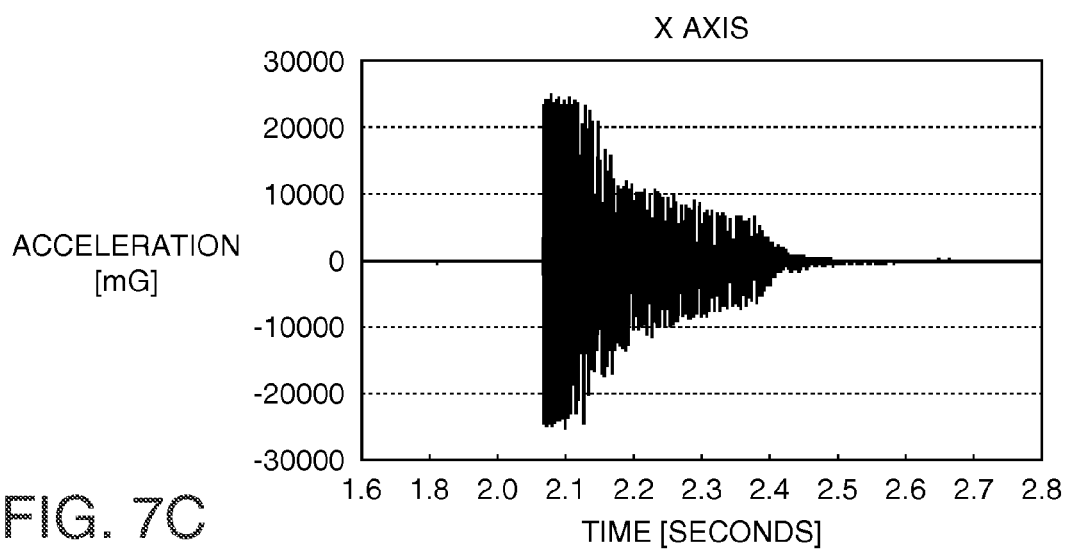

FIGS. 7A to 7C show graphs illustrating the results of measurement in which the sensor portion 2 is mounted via a mounting jig onto the mounting surface 1b of the tennis racket 1 shown in FIG. 1 (without the shock and vibration absorber 3).

Figure 8A:
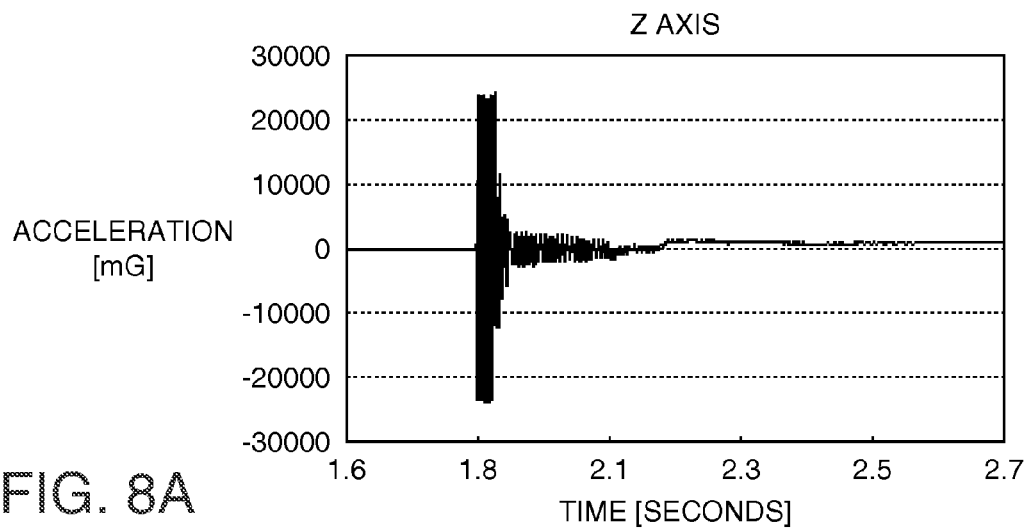
FIGS. 8A to 8C show measurement data of acceleration of a shock and vibration applied to the sensor unit according to the comparative example shown in FIG. 1.
Figure 8B:
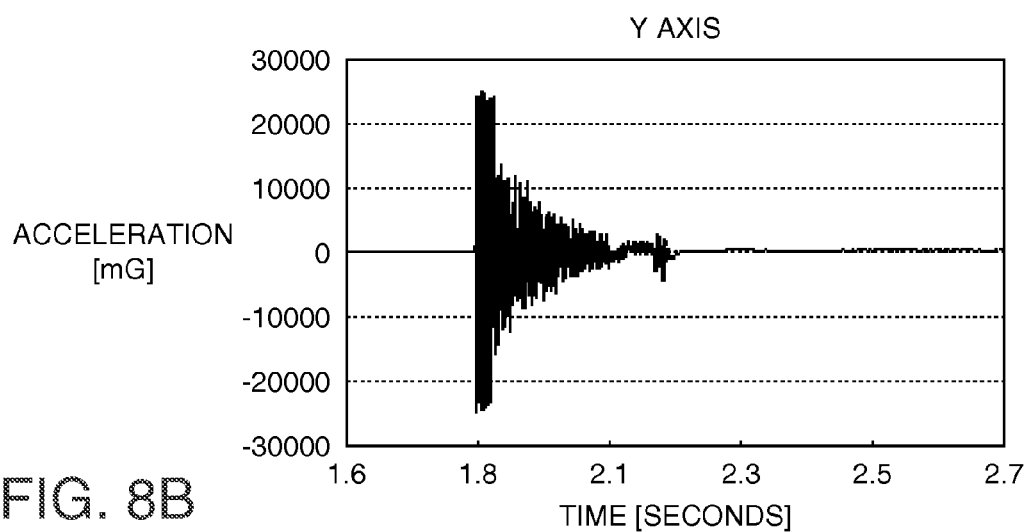
Figure 8C:
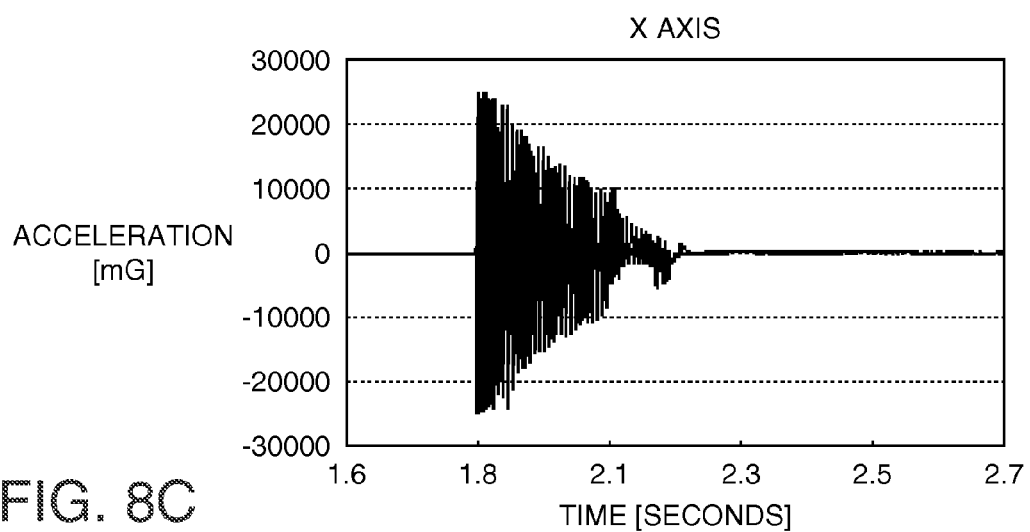

FIGS. 8A to 8C show graphs illustrating the results of measurement in which the sensor portion 2 is mounted via the shock and vibration absorber 3 by the method of the comparative example shown in FIG. 1.

Figure 9A:
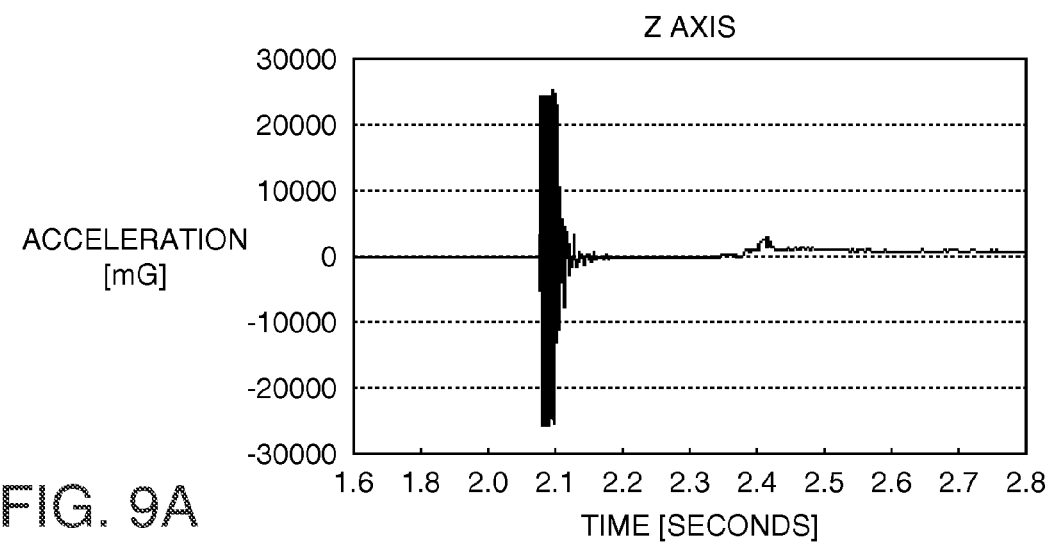
FIGS. 9A to 9C shows measurement data of acceleration of a shock and vibration applied to the sensor unit according to the first embodiment.
Figure 9B:
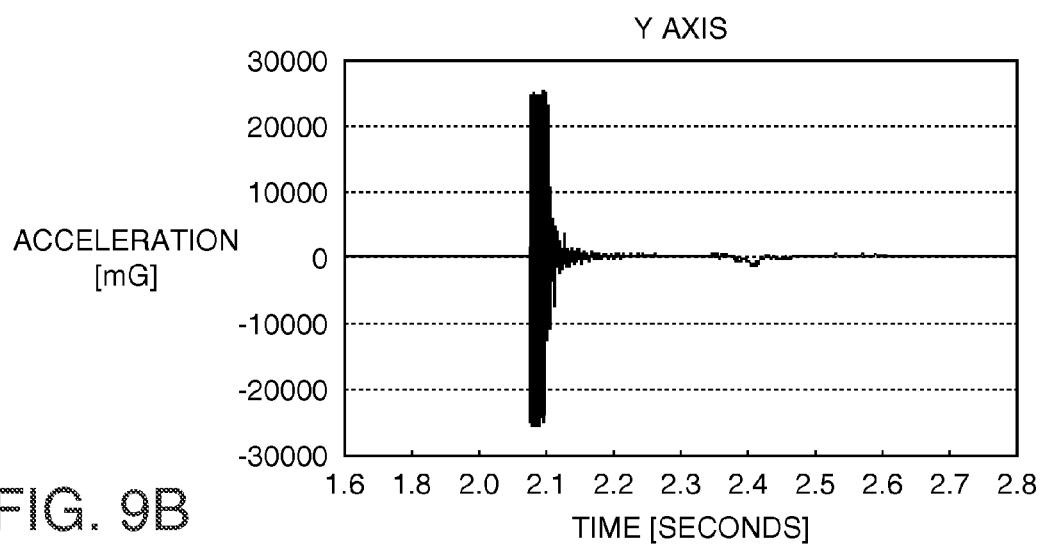
Figure 9C:
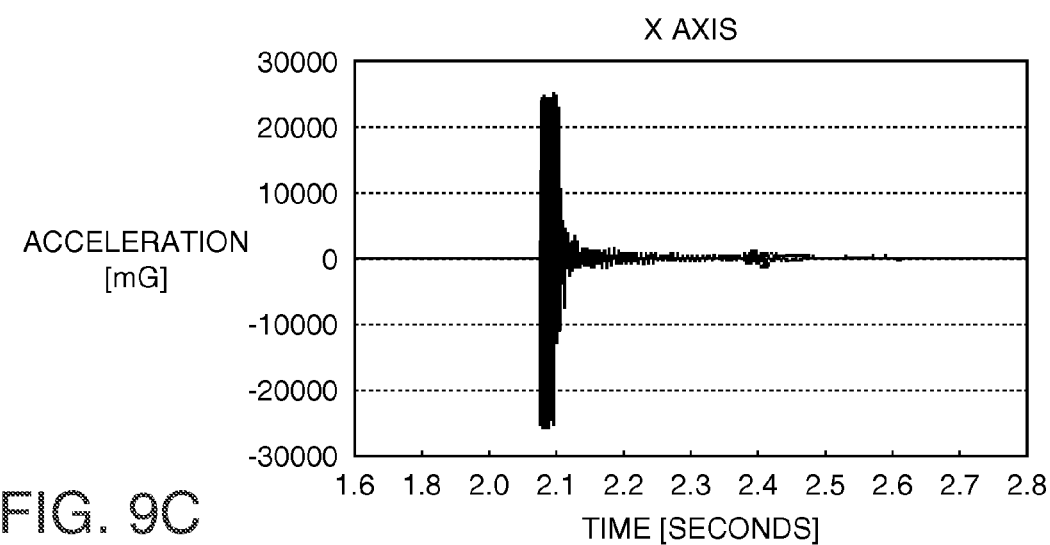

FIGS. 9A to 9C show graphs illustrating the results of measurement in which the sensor unit 10a of this embodiment shown in FIG. 4 is mounted on the mounting surface 1b of the tennis racket 1 shown in FIG. 1.

FIGS. 7A to 9C show data as a result of measuring acceleration on three axes (X, Y and Z axes) when the tennis racket 1 is dropped in the Z-axis direction from the same height.

FIG. 7A, FIG. 8A and FIG. 9A each show acceleration in the Z-axis direction. FIG. 7B, FIG. 8B and FIG. 9B each show acceleration in the Y-axis direction. FIG. 7C, FIG. 8C and FIG. 9C each show acceleration in the X-axis direction. A comparison between the graphs shown in FIGS. 7A to 7C and FIGS. 8A to 8C shows that the time when a strong shock (acceleration) in the Z-axis direction is received is shorter in the graph of FIG. 8A. This can be recognized as the effect of inserting the shock and vibration absorber 3 of FIG. 1. Meanwhile, the graphs of FIGS. 8B and 8C show greater changes in acceleration in the X and Y-axis directions than in the graphs shown in FIGS. 7B and 7C. It can be considered that this is because the swing of the sensor portion 2 itself becomes larger as the shock and vibration absorber 3 of FIG. 1 is inserted.

Meanwhile, in the graph shown in FIG. 9A illustrating data as a result of measurement by the sensor unit 10a of this embodiment, the time when a strong shock (acceleration) in the Z-axis direction is received is much shorter than in the graph shown in FIG. 8A, and the time when the influence of a shock and vibration is received is shorter also in the X-axis direction and the Y-axis direction, as shown in the graphs of FIGS. 9B and 9C. Thus, high effects can be confirmed.

The sensor unit 10a of the embodiment provides the following effects.

According to such a sensor unit 10a, the sensor portion 20 which measures acceleration and the like of a measurement target is provided in the buffer body 30 with a structure in which the first buffer portion 30a and the second buffer portion 30b which are different in specific gravity and hardness are superimposed on each other. Thus, in the sensor unit 10a, the second buffer portion 30b is deformed to absorb a shock and vibration from a measurement target and the deformation of the second buffer portion 30b is restrained by the first buffer portion 30a. Therefore, transmission of the shock and vibration to the sensor portion 20 can be restrained.

Second Embodiment

Figure 10:
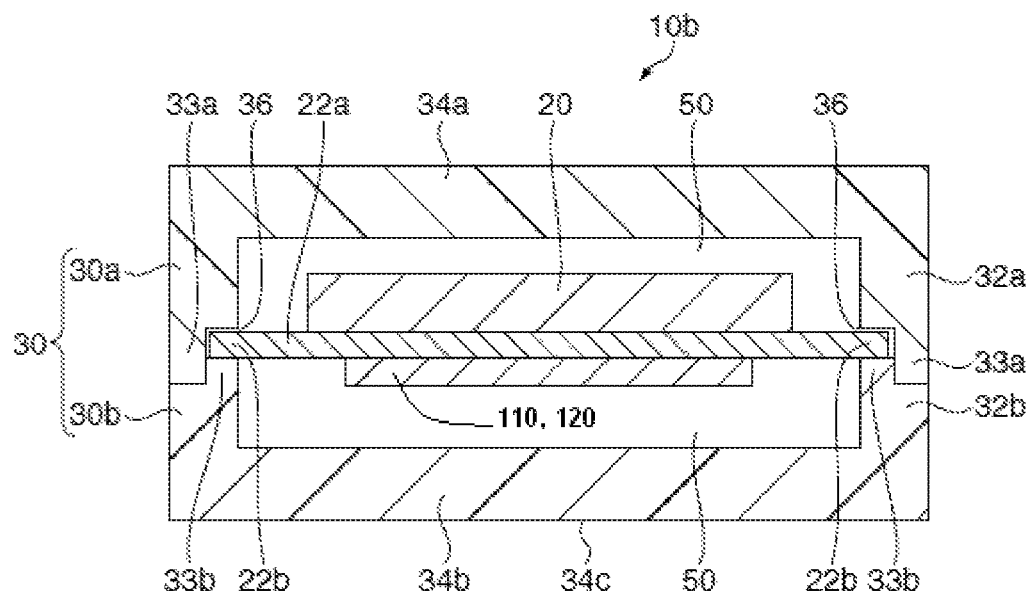
FIG. 10 is a sectional view of a sensor unit according to a second embodiment.

A sensor unit 10b according to a second embodiment of the invention is shown in FIG. 10. The sensor unit 10b shown in FIG. 10 is different from the sensor unit 10a shown in FIG. 4 in that a part of the first outer wall 32a and a part of the second outer wall 32b of the buffer body 30 extend respectively and the first buffer portion 30a and the second buffer portion 30b are jointed together in a box-joint form. Hereinafter, different features from the sensor unit 10a according to the first embodiment are described, whereas the same configurations are denoted by the same reference numerals and the description thereof is partly omitted.

The sensor unit 10b provides a sensor portion 20 and a buffer body 30, similarly to the sensor unit 10a according to the first embodiment. The buffer body 30 provides a first buffer portion 30a and a second buffer portion 30b made of different materials from each other. The buffer body 30 also provides a housing portion 50 that is surrounded by the first buffer portion 30a and the second buffer portion 30b.

As shown in FIG. 10, in the buffer body 30 of the sensor unit 10b, the first outer wall 32a of the first buffer portion 30a and the second outer wall 32b of the second buffer portion 30b are jointed together in a box-joint form. The first outer wall 32a extends a portion substantially half its thickness so as to protrude as a box joint portion 33a toward the second outer wall 32b. The second outer wall 32b extends a portion substantially half its thickness and different from the extended portion of the box joint portion 33a when joined with (fitted with) the first outer walls 32a, so as to protrude as a box joint portion 33b toward the first outer wall 32a.

In the buffer body 30, a holding portion 36 is provided between the box joint portion 33b extending toward the second outer wall 32b and the second outer wall 32b. The sensor portion 20 is provided in the housing portion 50, as in the sensor unit 10a. A peripheral edge portion 22b that is an edge portion of a substrate 22a is held by the holding portion 36 provided on the second buffer portion 30b.

The sensor unit 10b of the embodiment provides the following effect.

The sensor unit 10b provides a structure such that when the sensor unit 10b receives a shock and vibration, the shock and vibration is absorbed by the first buffer portion 30a and the second buffer portion 30b and is not easily transmitted to the sensor portion 20, as in the foregoing sensor unit 10a. Also, in the buffer body 30, since the first outer wall 32a and the second outer wall 32b are jointed together in a box-joint form, the area where the first outer wall 32a and the second outer walls 32b abut against each other is greater than in the sensor unit 10a. Thus, in the sensor unit 10b, a shock and vibration transmitted from the mounting surface 34c is absorbed by the second buffer portion 30b, and when the shock and vibration is transmitted to the first buffer portion 30a, the transmission to the first buffer portion 30a can be made efficiently. Moreover, when the shock and vibration is transmitted from the second buffer portion 30b to the first buffer portion 30a, a "shift" of the first buffer portion 30a and the second buffer portion 30b from each other can be restrained.

Third Embodiment

Figure 11:
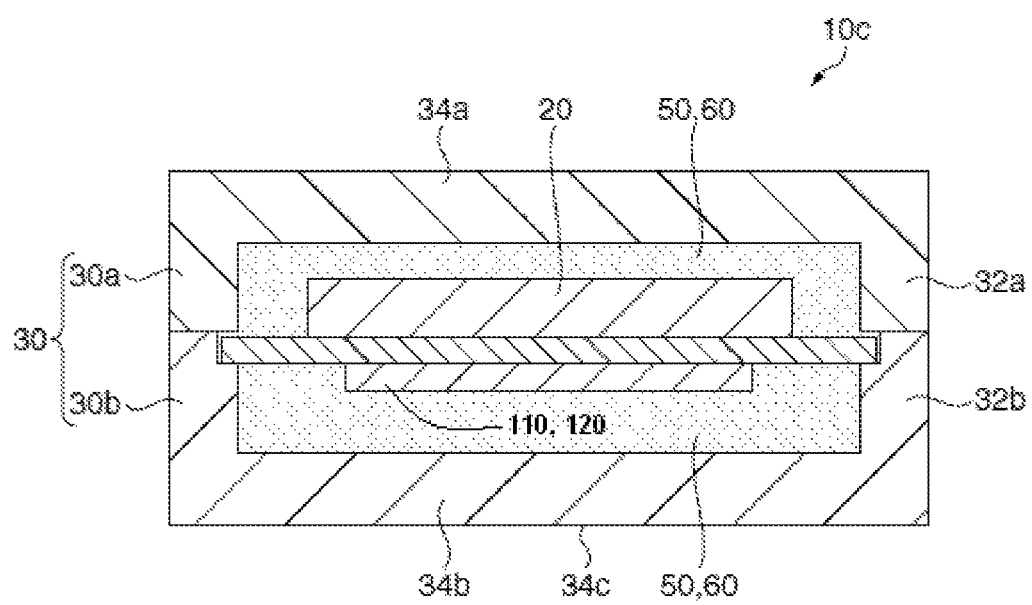
FIG. 11 is a sectional view of a sensor unit according to a third embodiment.

A sensor unit 10c according to a third embodiment is shown in FIG. 11. The sensor unit 10c shown in FIG. 11 is different from the sensor unit 10a shown in FIG. 4 in that the housing portion 50 having a void is filled with a filler 60. Different features from the sensor unit 10a according to the first embodiment are described, whereas the same configurations are denoted by the same reference numerals and the description thereof is partly omitted.

The filler 60 fills the gap between a first outer wall 32a, a second outer wall 32b, a first base portion 34a and a second base portion 34b, and a sensor portion 20. In other words, the filler 60 fills the void of the housing portion 50 in which the sensor portion 20 is provided. As the filler 60, a member that solidifies after filling the void is used. In this embodiment, for example, a potting material such as trade name TSE3051 (TANAC Co., Ltd.) or trade name 1230G (ThreeBond Co., Ltd.) can be preferably used as the filler 60.

While the sensor portion 20 is held by the holding portion 36 provided on the top surface 37b of the second outer wall 32b in the foregoing example as shown in FIG. 4, a substrate 22a of the sensor unit 10c according to the third embodiment shown in FIG. 11 need not be held since the filler 60 fills the housing portion 50. This is because the sensor portion 20 can be held by the filler 60 within the housing portion 50. Thus, the sensor portion 20 does not directly contact the second buffer portion 30b (second outer wall 32b), transmission of deformation of the second buffer portion 30b to the sensor portion 20 can be restrained. Therefore, the swing of the sensor portion 20 due to a shock and vibration can be reduced.

As the sensor unit 10c, a form in which the housing portion 50 of the sensor unit 10a shown in FIG. 4 is filled with the filler 60 is described. However, a form in which the housing portion 50 of the sensor unit 10b shown in FIG. 10 is filled with the filler 60 may also be employed.

The sensor unit 10c of the embodiment provides the following effects.

According to the sensor unit 10c, the sensor portion 20 can be fixed to the first base portion 34a of the first buffer portion 30a via the filler 60 filling the housing portion 50. Thus, the sensor portion 20 is fixed via the filler 60 onto the first base portion 34a having the least deformation in the buffer body 30 and therefore the swing of the sensor portion 20 can be reduced. Also, since the sensor portion 20 does not directly abut against the buffer body 30, transmission of a shock and vibration to the sensor portion 20 from the buffer body 30 can be restrained.

Fourth Embodiment

Figure 12:
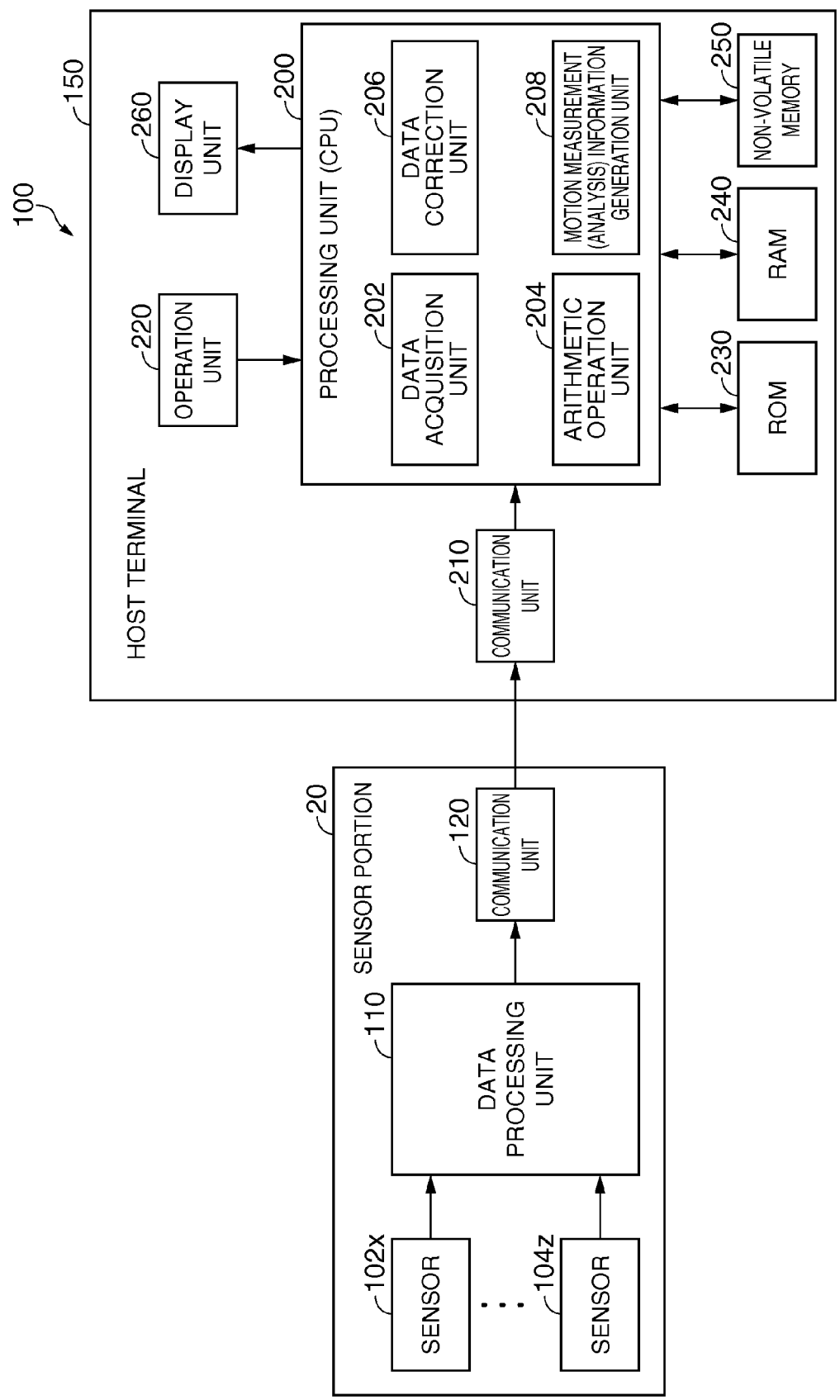
FIG. 12 is a block diagram showing a motion measurement system according to a fourth embodiment.

FIG. 12 shows the configuration of a motion measurement (analysis) system according to this embodiment. A motion measurement system 100 of this embodiment includes one of the above sensor units 10a, 10b, 10c (hereinafter referred to as a "sensor unit 10" where the unit is called by a general term) and a host terminal 150, and measures and analyzes a motion of a measurement target (for example, the tennis racket 1). The sensor portion 20 provided in the sensor unit 10 and the host terminal 150 may be connected wirelessly or wire-connected.

Figure 13:
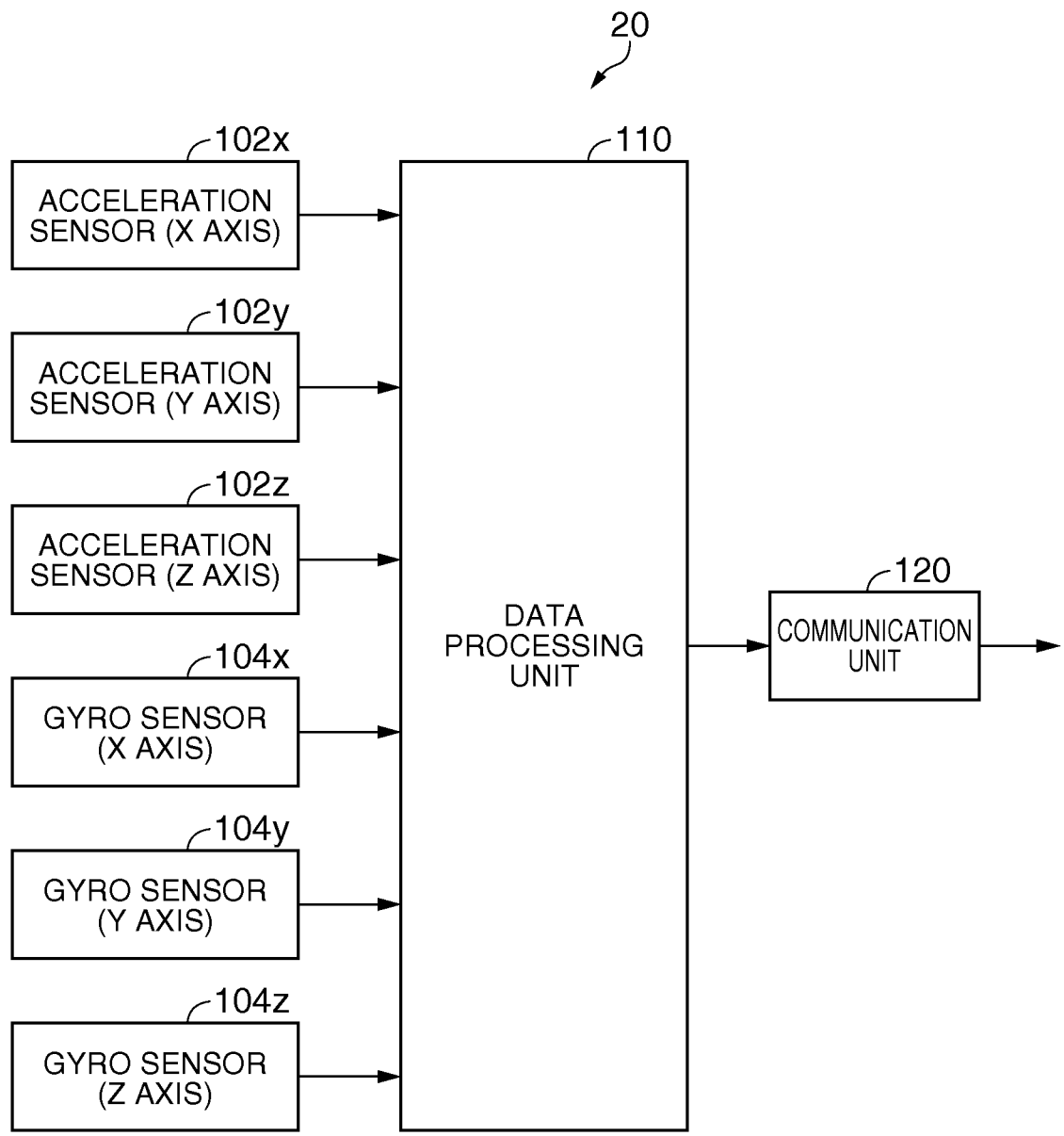
FIG. 13 is a block diagram showing details of a sensor portion provided in a sensor unit according to the fourth embodiment.

The sensor unit 10 is mounted on a measurement target of motion measurement (analysis), for example, on the tennis racket 1 shown in FIG. 1, and carries out processing to detect a predetermined physical quantity. In this embodiment, the sensor portion 20 includes, for example, plural sensors $102x$ to $102z$ and $104x$ to $104z$, a data processing unit 110, and a communication unit 120, also as shown in FIG. 13.

Here, the sensors are sensors which detect a predetermined physical quantity and output a signal (data) corresponding to the magnitude of the detected physical quantity (for example, acceleration, angular velocity and the like). In this embodiment, a six-axis motion sensor including three-axis acceleration sensors $102x$ to $102z$ which detect acceleration in the X-axis direction, Y-axis direction and Z-axis direction (an example of an inertial sensor) and three-axis gyro sensors $104x$ to $104z$ which detect angular velocity in the X-axis direction, Y-axis direction and Z-axis direction (an example of an angular velocity sensor and inertial sensor) is provided.

The data processing unit 110 carries out processing to synchronize output data from the respective sensors $102x$ to $102z$ and $104x$ to $104z$, combine the output data with time information and the like to form a packet, and output the packet to the communication unit 120. The data processing unit 110 may also carry out processing of bias correction and temperature correction on the sensors $102x$ to $102z$ and $104x$ to $104z$. The functions of bias correction and temperature correction may be incorporated in the sensors themselves.

The communication unit 120 carries out processing to transmit the packet data received from the data processing unit 110, to the host terminal 150.

The host terminal 150 shown in FIG. 12 includes a processing unit (CPU) 200, a communication unit 210, an operation unit 220, a ROM 230, a RAM 240, a non-volatile memory 250, and a display unit 260.

The communication unit 210 carries out processing to receive the data transmitted from the sensor portion 20 and send the data to the processing unit 200. The operation unit 220 carries out processing to acquire operation data from a user and send the operation data to the processing unit 200. The operation unit 220 is, for example, a touch panel display, button, key, microphone and the like.

The ROM 230 stores programs for the processing unit 200 to carry out various kinds of calculation and control processing, and various programs and data to realize application functions. The RAM 240 is a storage unit which is used as a work area for the processing unit 200 and which temporarily stores programs and data read out from the ROM 230, data inputted from the operation unit 220, and results of arithmetic operations executed by the processing unit 200 according to various programs. The non-volatile memory 250 is a storage unit which records data that needs to be saved for an extended period, of data generated in the processing by the processing unit 200.

The display unit 260 is to display results of processing by the processing unit 200, in the form of characters, graphs, or other images. The display unit 260 is, for example, a CRT, LCD, touch panel display, HDM (head-mounted display) and the like. Also, the functions of the operation unit 220 and the display unit 260 may be realized by a single touch panel display.

The processing unit 200 carries out various kinds of calculation processing with respect to data received from the sensor portion 20 via the communication unit 210 and various kinds of control processing (display control to the display unit 260 and the like) according to programs stored in the ROM 230.

In this embodiment, the processing unit 200 includes a data acquisition unit 202, an arithmetic operation unit 204, a data correction unit 206, and a motion measurement (analysis) information generation unit 208. The data acquisition unit 202 carries out processing to acquire output data from the sensors $102x$ to $102z$ and the sensors $104x$ to $104z$. The acquired data is stored, for example, in the RAM 240. The arithmetic operation unit 204 carries out arithmetic operation to calculate m-order time integration of the output data from the sensor portion 20. Thus, velocity data and position data are generated based on acceleration data. Alternatively, an angle is generated based on angular velocity data.

The data correction unit 206 corrects the result of the arithmetic operation by the arithmetic operation unit 204, for example, based on known data of a standstill state. The motion measurement (analysis) information generation unit 208 carries out processing to generate information for measuring (analyzing) a motion of a measurement target (hereinafter referred to as "motion analysis information"), based on the corrected data from the data correction unit 206. The generated motion analysis information may be displayed on the display unit 260 in the form of characters, graphs, diagrams and the like, or may be outputted outside the host terminal 150. The arithmetic operation unit 204, the data correction unit 206, and the motion measurement (analysis) information generation unit 208 are an example of a motion measurement (analysis) unit.

The motion measurement system 100 of the embodiment provides the following effects.

According to the motion measurement system 100, since the system includes the sensor unit 10, an excessive shock and vibration that is generated, for example, by hitting an object with the measurement target, can be absorbed by the first buffer portion 30a and the second buffer portion 30b. Thus, measurement of an unwanted shock and vibration for motion measurement of the measurement target can be restrained and a predetermined physical quality of the measurement object can be measured accurately.

The invention is not limited to the above embodiments and various changes, improvements and the like can be added without departing from the scope of the invention. A modification is described hereinafter.

Modification 1

Figure 14:
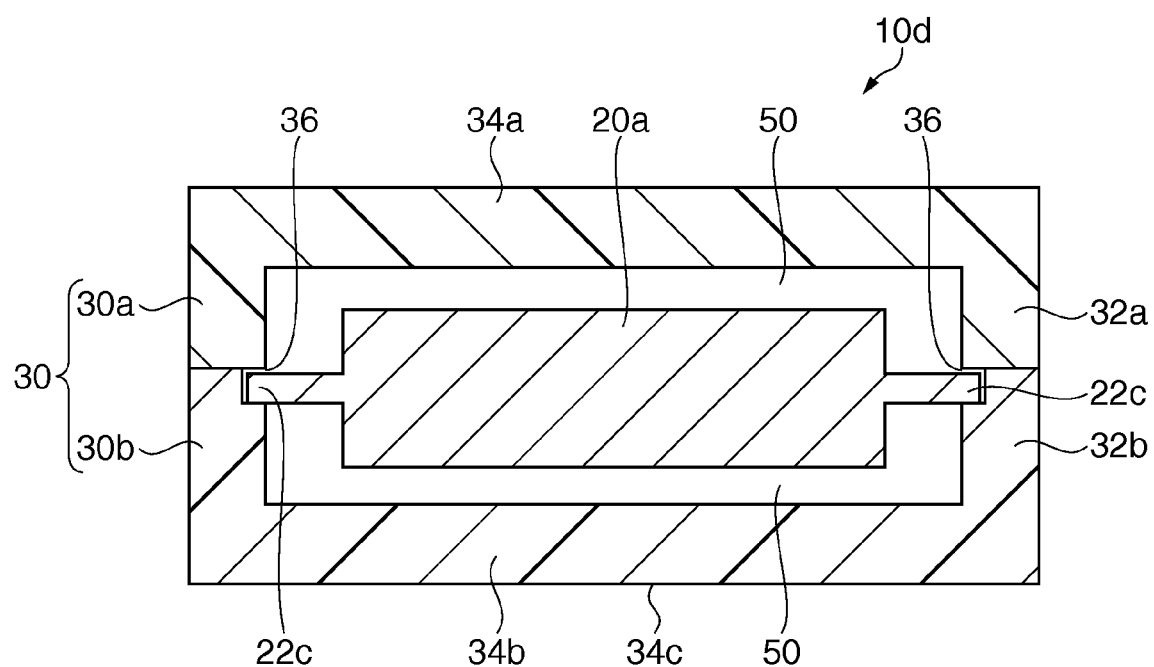
FIG. 14 is a sectional view of a sensor unit according to a modification.

The sensor portion 20 in the sensor units 10a, 10b, 10c can be an inertial measurement unit 20a. A sensor unit 10d shown in FIG. 14 includes the inertial measurement unit 20a and a buffer body 30, and the buffer body 30 includes a first buffer portion 30a and a second buffer portion 30b, as in the sensor units 10a, 10b, 10c. The inertial measurement unit 20a is provided in a housing portion 50, and a mounting portion 22c extending from the inertial measurement unit 20a is held by a holding portion 36 provided on a second outer wall 32b of the second buffer portion 30b. Thus, in the sensor unit 10d, a shock and vibration can be absorbed by the buffer body 30, for example, when the sensor unit 10d is mounted on the tennis racket 1 (see FIGS. 1 to 3) and the like. Therefore, transmission of the shock and vibration to the inertial measurement unit 20a can be restrained.

The entire disclosure of Japanese Patent Application No. 2012-127814, filed Jun. 5, 2012 is expressly incorporated by reference herein.

What is claimed is:

1. A sensor unit comprising:
    a buffer body comprising a first buffer portion and a second buffer portion that directly abuts against the first buffer portion and is softer than the first buffer portion; and
    a sensor portion arranged inside the buffer body;
    wherein the first buffer portion provides a first base portion and a first outer wall provided on a peripheral edge of the first base portion,
    the second buffer portion provides a second base portion which provides a mounting surface outside to a measurement target, and a second outer wall provided on a peripheral edge of the second base portion,
    the buffer body provides the first base portion and the second base portion facing each other and also provides a top surface of the first outer wall and a top surface of the second outer wall directly abutting against each other, and a housing portion for the sensor portion is provided inside, and
    a holding portion which holds the sensor portion is provided at least at a part of the top surface of at least one of the first buffer portion and the second buffer portion, and the sensor portion is held by the holding portion,
    wherein the sensor portion is mounted on a substrate, and a peripheral edge portion of the substrate is held by the holding portion such that the peripheral edge portion is abutted by each of the top surfaces of the first and second outer walls to suspend the sensor portion between the first and second buffer portions.

2. The sensor unit according to claim 1, wherein the housing portion is filled with a filler.

3. The sensor unit according to claim 1, wherein there is a gap between the substrate and at least one of the top surface of the first outer wall and the top surface of the second outer wall.

4. The sensor unit according to claim 1, wherein the first buffer portion and the second buffer portion are fitted with each other.

5. The sensor unit according to claim 1, wherein the second buffer portion provides a smaller specific gravity than the first buffer portion.

6. A motion measurement system including the sensor unit according to claim 1.

7. The sensor unit according to claim 1, wherein the first buffer portion is formed from silicone or rubber, and the second buffer portion is formed from polyurethane or urethane foam.

* * * * *